(12) United States Patent
Zhang et al.

(10) Patent No.: US 11,222,046 B2
(45) Date of Patent: Jan. 11, 2022

(54) ABNORMAL SAMPLE PREDICTION

(71) Applicant: Advanced New Technologies Co., Ltd., George Town (KY)

(72) Inventors: Yalin Zhang, Hangzhou (CN); Longfei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,575

(22) Filed: May 29, 2020

(65) Prior Publication Data

US 2020/0293554 A1  Sep. 17, 2020

Related U.S. Application Data

(63) Continuation of application No. PCT/CN2019/073411, filed on Jan. 28, 2019.

(30) Foreign Application Priority Data

Mar. 15, 2018 (CN) .......................... 201810215700.0

(51) Int. Cl.
*G06N 20/10* (2019.01)
*G06N 5/04* (2006.01)
(Continued)

(52) U.S. Cl.
CPC ............ *G06F 16/285* (2019.01); *G06F 17/16* (2013.01); *G06F 17/18* (2013.01); *G06N 5/04* (2013.01); *G06N 20/10* (2019.01)

(58) Field of Classification Search
CPC ........ G06F 16/285; G06F 17/16; G06F 17/18; G06N 20/10; G06N 5/04
See application file for complete search history.

(56) References Cited

U.S. PATENT DOCUMENTS

| 9,830,558 | B1 | 11/2017 | Chaudhuri et al. |
| 2019/0042977 | A1* | 2/2019 | Chaudhuri ........... G06K 9/6269 |
| 2019/0171742 | A1* | 6/2019 | Cohen ................. G06F 16/2453 |

FOREIGN PATENT DOCUMENTS

| CN | 101458522 | 6/2009 |
| CN | 103810101 | 5/2014 |
| CN | 104077571 | 10/2014 |
| CN | 104462184 | 3/2015 |

(Continued)

OTHER PUBLICATIONS

Sangwook Kim, Yonghwa Choi, and Minho Lee, "Deep learning with support vector data description", Available online Apr. 6, 2015, Neurocomputing 165 (2015), pp. 111-117. (Year: 2015).*

(Continued)

*Primary Examiner* — Kamran Afshar
*Assistant Examiner* — Ying Yu Chen
(74) *Attorney, Agent, or Firm* — Fish & Richardson P.C.

(57) ABSTRACT

Implementations of the present specification provide abnormal sample prediction methods and apparatuses. The method includes: obtaining a sample to be tested, wherein the sample to be tested comprises feature data with a given dimension, and wherein the given dimension is a first quantity; performing dimension reduction processing on the sample to be tested by using multiple dimension reduction methods to obtain multiple processed samples; inputting the multiple processed samples to multiple corresponding processing models to obtain scores of the multiple processed samples, wherein an ith processing model Mi in the multiple processing models scores the corresponding processed sample Si based on a hypersphere Qi; determining a comprehensive score of the sample to be tested based on scores of the multiple processed samples; and classifying, based on the comprehensive score, the sample to be tested as an abnormal sample.

21 Claims, 6 Drawing Sheets

(51) Int. Cl.
*G06F 16/28* (2019.01)
*G06F 17/16* (2006.01)
*G06F 17/18* (2006.01)

(56) References Cited

FOREIGN PATENT DOCUMENTS

| CN | 105718876 | 6/2016 |
|---|---|---|
| CN | 107563008 | 1/2018 |
| CN | 107578056 | 1/2018 |
| CN | 108595495 | 9/2018 |
| TW | 201805853 | 2/2018 |

OTHER PUBLICATIONS

Mayu Sakurada and Takehisa Yairi, "Anomaly Detection Using Autoencoders with Nonlinear Dimensionality Reduction", Dec. 2, 2014, MLSDA '14, pp. 1-8. (Year: 2014).*

Félix Iglesias and Tanja Zseby, "Analysis of network traffic features for anomaly detection", Published online: Dec. 4, 2014, Mach Learn (2015) 101. pp. 59-84. (Year: 2014).*

Mohamed El Boujnouni and Mohamed Jedra, "New Intrusion Detection System Based on Support Vector Domain Description with Information Gain Metric", Jan. 2018, International Journal of Network Security, vol. 20, No. 1, pp. 25-34, (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Appln. No. PCT/CN2019/073411, dated Apr. 28, 2019, 10 pages (with partial English translation).

Wu et al., "Overview of One-Class Classification Method Based on Support Vectors," Dept of Artillery Engineering, Ordinance Engineering College, Mar. 2011, 37(5); 3 pages (with English abstract).

* cited by examiner

ABNORMAL SAMPLE PREDICTION

CROSS-REFERENCE TO RELATED APPLICATIONS

This application is a continuation of PCT Application No. PCT/CN2019/073411, filed on Jan. 28, 2019, which claims priority to Chinese Patent Application No. 201810215700.0, filed on Mar. 15, 2018, and each application is hereby incorporated by reference in its entirety.

TECHNICAL FIELD

One or more implementations of the present specification relate to the field of classifying samples by using a computer, and in particular, to abnormal sample prediction methods and apparatuses.

BACKGROUND

With the development of computers and Internet technologies, massive data and samples are generated. In many scenarios, the data and the samples need to be classified, for example, a distinction is made between normal samples and abnormal samples. For example, in payment and transaction services, it is often necessary to distinguish between normal transaction samples and abnormal transaction samples (for example, cash-out and financial fraud transactions), to better prevent payment risks. In the security access field, it is often necessary to distinguish between normal access data and abnormal access data. The abnormal access data often comes from attempts made by some users to intrude or to obtain illegal data through illegal access. Such abnormal access data is often quite harmful, and therefore it is very important for data security to identify and predict such data to prevent abnormal access.

With the emergence of artificial intelligence and machine learning, increasing service scenarios begin to introduce machine learning for data analysis, including sample classification and prediction. Machine learning usually needs a large amount of data to train a model. Especially, for supervised learning, a classifier needs to be trained and adjusted by using known types of samples, or referred to as labeled samples, before the classifier can be used to classify unknown samples.

However, in some cases, it is usually difficult to collect and label abnormal samples. There is usually a smaller quantity of abnormal samples. In addition, it is difficult to find the abnormal samples for the abnormal samples are usually hidden. For example, it is usually difficult to detect the abnormal access data. Consequently, a smaller quantity of abnormal samples can be obtained and identified, which makes supervised learning difficult to perform.

SUMMARY

One or more implementations of the present specification describe methods and apparatuses, to effectively predict an unknown sample when only a normal historical sample set is obtained and a sample dimension is high.

According to a first aspect, an abnormal sample prediction method is provided, and includes: obtaining a sample to be tested, where the sample to be tested includes feature data whose dimension is a first quantity; performing dimension reduction processing on the sample to be tested by using multiple dimension reduction methods, to obtain multiple processed samples, where the ith dimension reduction method $P_i$ in the multiple dimension reduction methods processes the sample to be tested as a processed sample $S_i$ whose dimension is $D_i$, and the dimension $D_i$ is less than the first quantity; respectively inputting the multiple processed samples to multiple corresponding processing models, to obtain scores of the multiple processed samples, where the ith processing model $M_i$ in the multiple processing models scores the corresponding processed sample $S_i$ based on a hypersphere $Q_i$ predetermined by using a support vector domain description (SVDD) method in a space corresponding to the dimension $D_i$; determining a comprehensive score of the sample to be tested based on the scores of the multiple processed samples; and determining, based on the comprehensive score, whether the sample to be tested is an abnormal sample.

In a possible solution, the multiple dimension reduction methods include at least one of an operation dimension reduction method and a feature sampling dimension reduction method.

In an implementation, the operation dimension reduction method includes one or more of the following: a principal component analysis (PCA) method, a least absolute shrinkage and selection operator (LASSO) method, a linear discriminant analysis (LDA) method, and a wavelet analysis method.

In an implementation, the feature sampling dimension reduction method includes one or more of the following: a random sampling method, a hash sampling method, a filter feature selection method, and a wrapper feature selection method.

In an implementation, the ith processing model $M_i$ is trained by performing the following steps: obtaining a known normal historical sample set, where a sample dimension of the historical sample set is the first quantity; processing the historical sample set as a low-dimensional historical sample set $L_i$ whose sample dimension is $D_i$ by using the ith dimension reduction method $P_i$; and determining the hypersphere $Q_i$ in the space whose dimension is $D_i$ by using the SVDD method, so that a relationship between the quantity of samples in a low-dimensional historical sample set $L_i$ surrounded by the hypersphere $Q_i$ and a radius of the hypersphere satisfies a predetermined condition.

In an implementation, the scoring the corresponding processed sample $S_i$ includes: determining a relative location of the processed sample $S_i$ relative to the hypersphere $Q_i$ in the space corresponding to the dimension; and determining a score of the processed sample $S_i$ based on the relative location.

In a possible implementation, the relative location includes one of the following: the processed sample $S_i$ is located outside, inside, or above the hypersphere $Q_i$; a distance between the processed sample $S_i$ and a center of the hypersphere $Q_i$ in the space corresponding to the dimension; and a distance between the processed sample $S_i$ and the nearest surface of the hypersphere $Q_i$ in the space corresponding to the dimension.

In an implementation, the determining a comprehensive score of the sample to be tested includes: performing weighted summation on the scores of the multiple processed samples to obtain the comprehensive score.

According to a second aspect, an abnormal sample prediction apparatus is provided, and includes: an acquisition unit, configured to obtain a sample to be tested, where the sample to be tested includes feature data whose dimension is a first quantity; multiple dimension reduction units, where the multiple dimension reduction units are configured to perform dimension reduction processing on the sample to be tested by using multiple dimension reduction methods, to obtain multiple processed samples, the ith dimension reduction method Pi in the multiple dimension reduction methods processes the sample to be tested as a processed sample Si whose dimension is Di, and the dimension Di is less than the first quantity; multiple scoring units, configured to score the multiple processed samples by using multiple processing models, where the ith processing model Mi in the multiple processing models scores the corresponding processed sample Si based on a hypersphere Qi predetermined by using a support vector domain description (SVDD) method in a space corresponding to the dimension Di; a comprehensive unit, configured to determine a comprehensive score of the sample to be tested based on scores of the multiple processed samples; and a determining unit, configured to determine, based on the comprehensive score, whether the sample to be tested is an abnormal sample.

According to a third aspect, a computer-readable storage medium is provided, where the computer-readable storage medium stores a computer program, and when the computer program is executed in a computer, the computer is enabled to perform the method according to the first aspect.

According to a fourth aspect, a computing device is provided, and includes a memory and a processor, where the memory stores executable code, and when the processor executes the executable code, the method according to the first aspect is implemented.

According to the methods and apparatuses provided in the implementations of the present specification, dimension reduction is performed on a sample to be tested by using multiple dimension reduction methods, then, multiple processed samples obtained after dimension reduction are scored respectively based on hyperspheres determined based on SVDD models, and finally, whether the sample to be tested is abnormal is determined based on a comprehensive result of multiple scores. The multiple different dimension reduction methods are used, and therefore features obtained by using the dimension reduction methods can complement each other. As such, an information loss caused by dimension reduction is alleviated to the maximum extent. In addition, dimension reduction processing is performed, and therefore application of the SVDD models becomes feasible. As such, a calculation obstacle caused by a dimension "explosion" is alleviated. On this basis, the results of the SVDD models are comprehensively considered, so that the sample to be tested can be comprehensively evaluated and accurately predicted.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

The following describes the solutions provided in the present specification with reference to the accompanying drawings.

Figure 1:
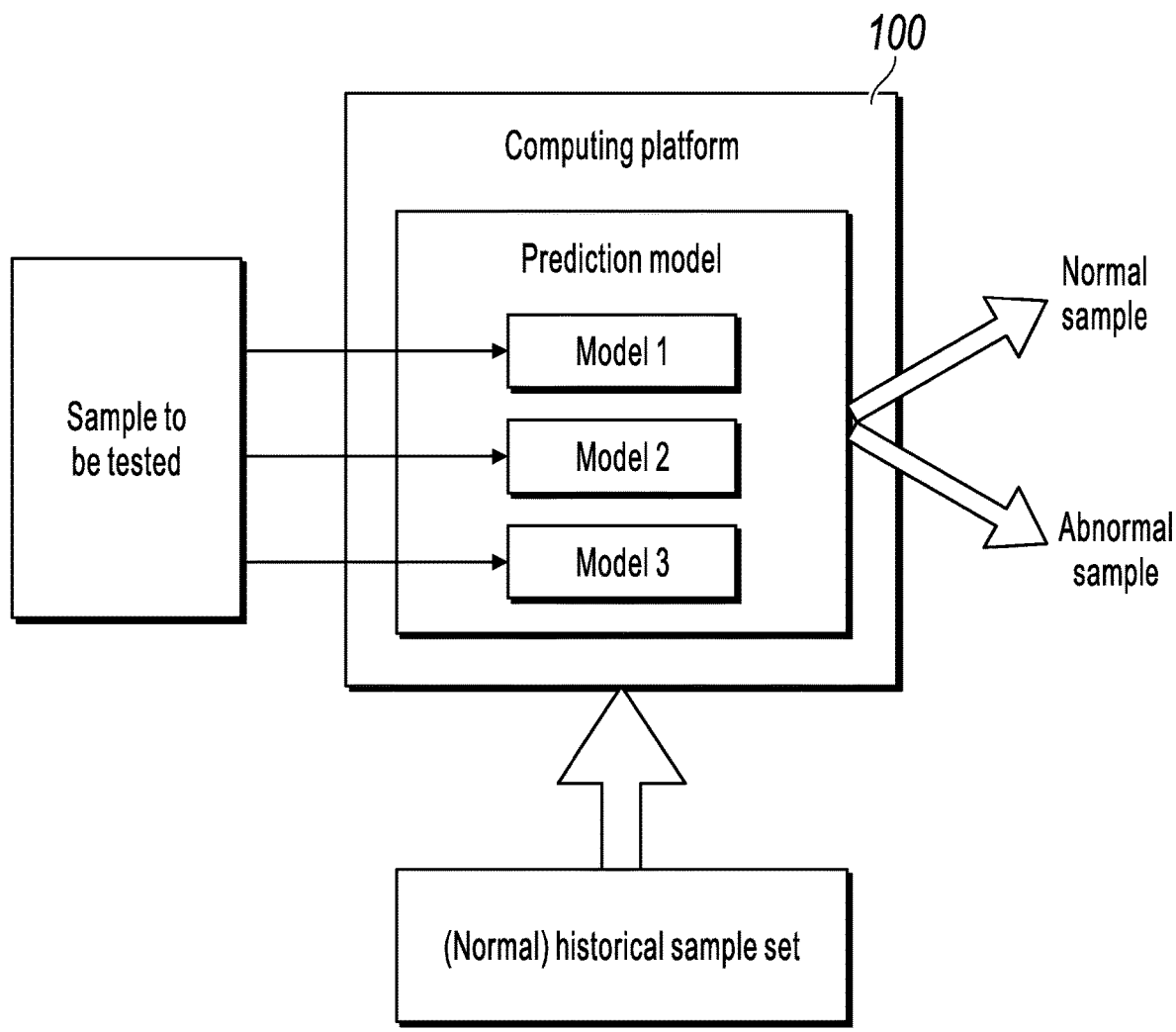
FIG. 1 is a schematic diagram illustrating an implementation scenario of an implementation, according to the present specification.

FIG. 1 is a schematic diagram illustrating an implementation scenario of an implementation, according to the present specification. As shown in FIG. 1, a computing platform 100, for example, an ALIPAY server, trains a prediction model by using a support vector domain description (SVDD) method based on a normal historical sample set (for example, a normal historical transaction sample set). In a training process, to alleviate calculation difficulties caused by a very high sample dimension, the computing platform 100 respectively performs dimension reduction on each historical sample using multiple dimension reduction methods, to obtain multiple dimension reduction sample sets, and then learns and obtains multiple processing models with the dimension reduction sample sets using the SVDD method. These processing models can be considered as sub-models of the prediction model, and these sub-models are combined into the prediction model. As such, when an unknown sample to be tested is obtained, dimension reduction is performed on the sample to be tested by using the same multiple dimension reduction methods. A processed sample is input to each corresponding sub-model in the prediction model, the sample to be tested is scored using each sub-model, and finally, whether the sample to be tested is an abnormal sample is predicted based on a comprehensive result of scores from the sub-models. The following describes specific implementation processes of the previous two phases.

First, building and training of the prediction model are described. As described above, supervised learning is performed on samples. Therefore, a major difficulty in training the prediction model is that it is difficult to obtain abnormal samples and supervised learning cannot be performed on the abnormal samples due to a smaller quantity of abnormal samples. Therefore, in the implementations of the present specification, a model is built by using a support vector domain description (SVDD) method based on only normal historical samples. The following describes a processing method of the SVDD method.

Figure 2A:
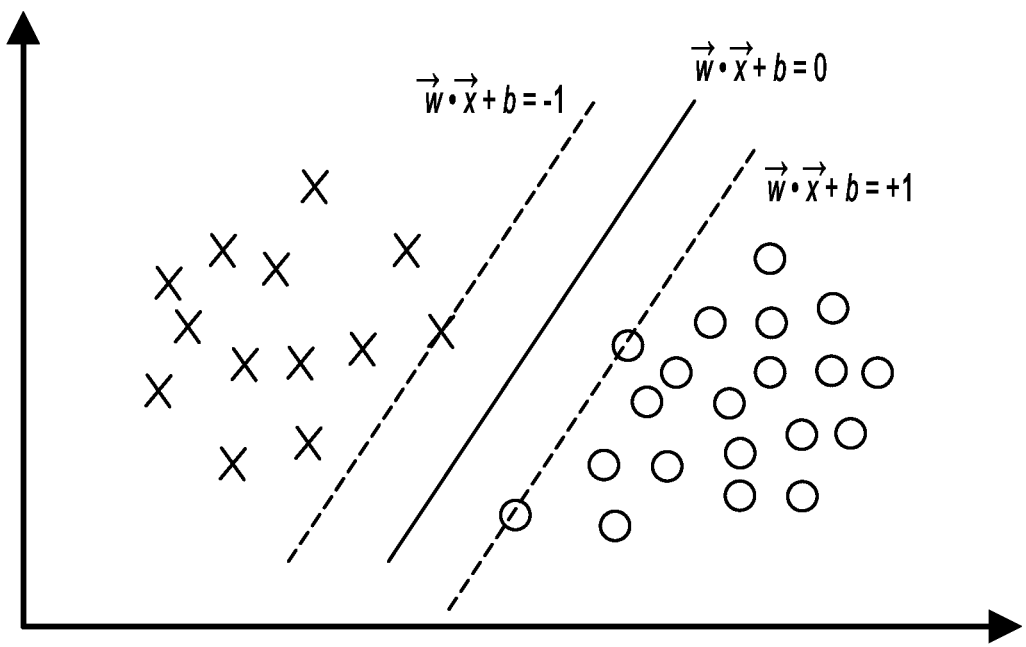
FIG. 2A is a schematic diagram illustrating an SVM model.

The SVDD is a model developed based on a support vector machine (SVM) idea. An SVM model is still a supervised learning model. Samples need to be labeled as different types in advance. In a training process, sample vectors are first mapped to a high-dimensional space, and a maximum margin hyperplane is built in the space, to separate different types of samples. FIG. 2A is a schematic diagram illustrating the SVM model. In FIG. 2A, in an example, binary classification is performed on samples in a two-dimensional case. As shown in FIG. 2A, two parallel hyperplanes (shown by using dashed lines) are built on both sides of a hyperplane that separates sample data (two types of samples are respectively shown as circles and crosses). The hyperplanes are separated to maximize the distance between the two parallel hyperplanes. Sample points on the two parallel hyperplanes are referred to as support vectors.

Figure 2B:
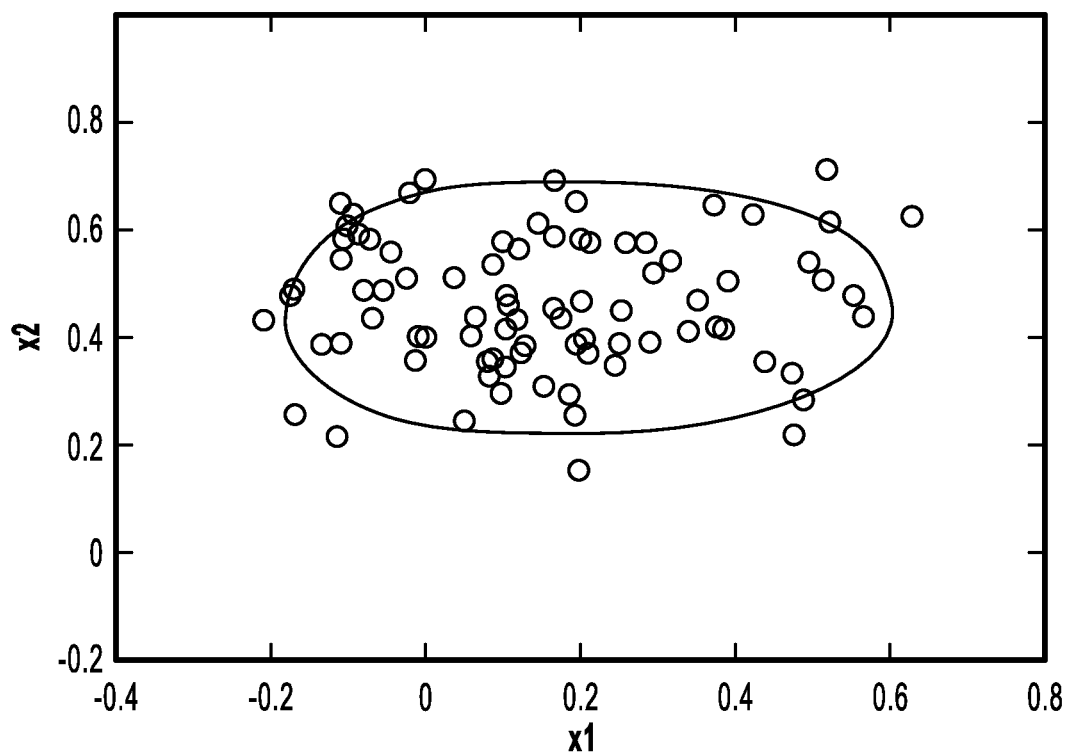
FIG. 2B is a schematic diagram illustrating an SVDD model.

The SVDD developed based on the SVM model can be trained based on a given type of samples. FIG. 2B is a schematic diagram illustrating the SVDD model. As shown in FIG. 2B, the main idea of the SVDD model is as follows: A specific quantity of samples of the same type, for example, normal historical samples, are provided, these samples are mapped to a high-dimensional space, and then an ellipsoid is built in the high-dimensional space, so that the ellipsoid is as small as possible and includes as many samples as possible. It can be understood that the concept of "ellipsoid" is merely for ease of description. In the high-dimensional space, the ellipsoid actually corresponds to a hypersphere of the high-dimensional space. In other words, the objective of the SVDD model is as follows: For each known normal sample xi, a minimum hypersphere whose center is a and radius is R is obtained in a space corresponding to xi, so that as many sample points are located in the sphere (a distance from the center of the sphere is less than R) as possible, that is, an objective function F is constructed:

$$F(R, \vec{a}, \xi_i) = R^2 + C \sum_{i=1}^{N} \xi_i, \quad (1)$$

so that $$\|(\vec{x}_i - \vec{a})\|^2 \leq R^2 + \xi_i \forall i, \ \xi_i \geq 0. \quad (2)$$

It can be understood that, that the radius R of the hypersphere is expected to be as small as possible (a first condition) and that the hypersphere is expected to include as many sample points as possible (a second condition) are two mathematically contradictory conditions. Therefore, the parameter C is set in the previous equation, to measure a consideration proportion for the first condition and the second condition. For example, when the value of C is larger, it is inclined to find a hypersphere that can include more sample points. When the value of C is smaller, it is inclined to find a smaller hypersphere. The determined hypersphere can be used to predict an unknown sample. If the unknown sample is located in the hypersphere, there is a higher probability that the unknown sample is a normal sample. If the unknown sample is located outside the hypersphere, the unknown sample is a potential abnormal sample.

The SVDD model can be modeled based on a single type of sample data, for example, based on normal samples. However, when a dimension of the sample data is high, a "dimension explosion" is prone to occur, and a required calculation efficiency is hard to be achieved. If dimension reduction processing is performed on the sample data, some useful information is lost, and consequently a training result is not accurate. Therefore, in the implementations of the present specification, dimension reduction is innovatively performed by using multiple methods to complement each other, and then the SVDD method is used for dimension reduction sample data, to obtain sub-models. The multiple sub-models are combined into a prediction model.

Figure 3:
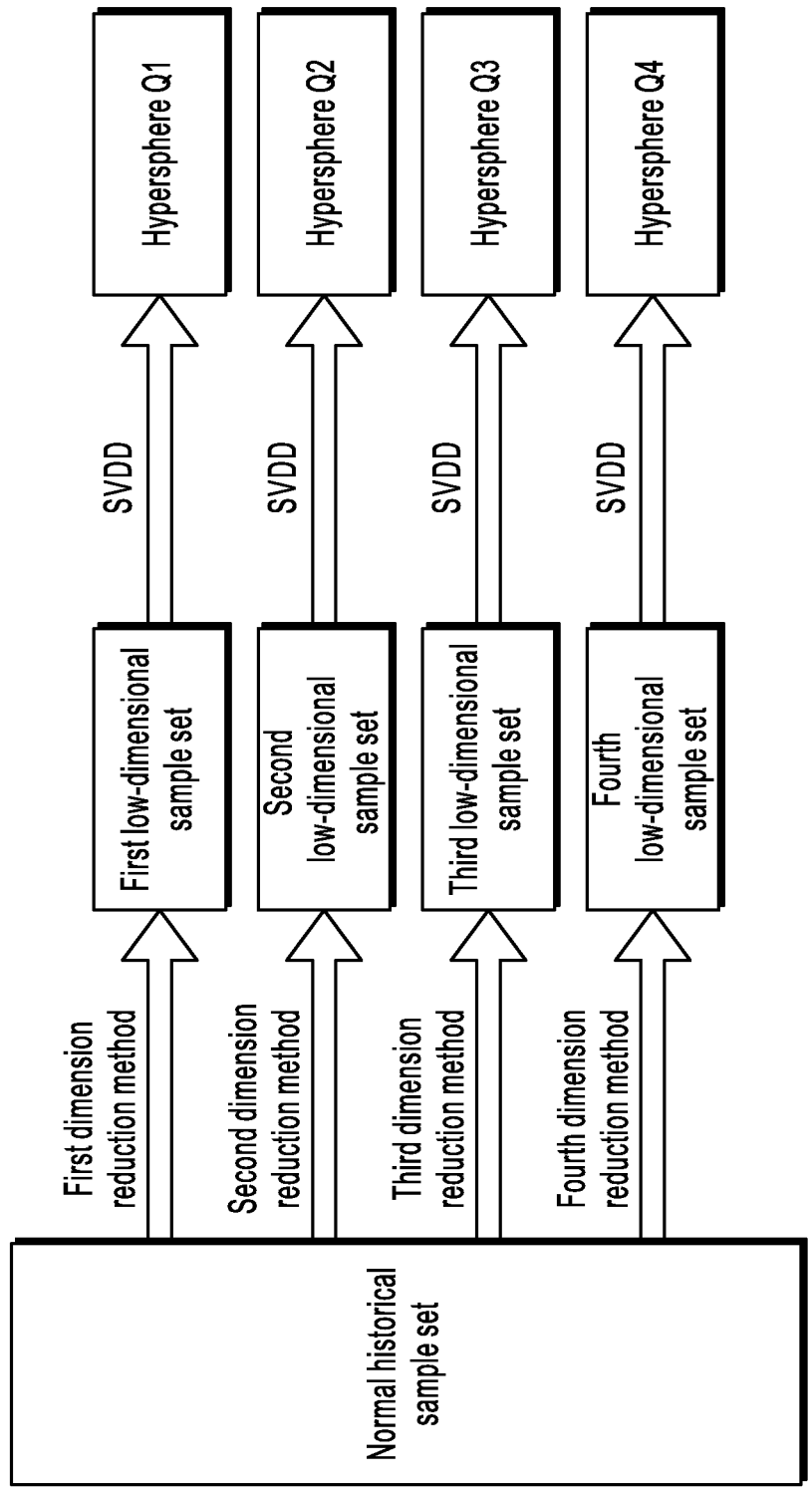
FIG. 3 is a schematic diagram illustrating building a prediction model, according to an implementation.

FIG. 3 is a schematic diagram illustrating building a prediction model, according to an implementation. As shown in FIG. 3, a known normal historical sample set H is first obtained, and includes multiple known normal historical samples. These historical samples usually have a relatively high dimension. For example, feature data involved in a transaction sample can include buyer information, seller information, transaction target information, a transaction time, a transaction place, and transaction record related to the transaction. Each term can be further refined. Therefore, in some cases, the transaction sample usually includes thousands of dimensions of feature data. For another example, feature data involved in an access sample can include a network address of an access initiator, personal information, an initiation time, an initiation place, a network address of an access target, and a related access record. Therefore, the normal access sample usually has hundreds to thousands of dimensions.

Dimension reduction is performed on the sample set H that includes these high-dimensional historical samples by using multiple (N) dimension reduction methods (P1, P2, . . . Pi, . . . PN), to obtain multiple (N) low-dimensional historical sample sets (L1, L2, . . . Li, . . . LN). Specifically, dimension reduction processing is performed on the high-dimensional historical sample set H by using any dimension reduction method Pi in the N dimension reduction methods, to obtain a low-dimensional historical sample set Li whose dimension is Di. Dimensions of the N low-dimensional historical sample sets obtained by using the N dimension reduction methods can be different, but are all less than the dimension of the original samples.

FIG. 3 illustrates a case in which N=4. More specifically, in FIG. 3, the multiple dimension reduction methods are specifically a first dimension reduction method, a second dimension reduction method, a third dimension reduction method, and a fourth dimension reduction method. Dimension reduction processing is performed on the original high-dimensional historical sample set by using these dimension reduction methods, to obtain a first low-dimensional sample set, a second low-dimensional sample set, a third low-dimensional sample set, and a fourth low-dimensional sample set. Dimensions of the first low-dimensional sample set, the second low-dimensional sample set, the third low-dimensional sample set, and the fourth low-dimensional sample set are respectively D1, D2, D3, and D4.

The dimension reduction methods can use various known dimension reduction algorithms and dimension reduction algorithms that may be used later.

In an implementation, the multiple dimension reduction methods include an operation dimension reduction method. The operation dimension reduction method is to perform a linear or nonlinear operation on feature data in an original high-dimensional sample, to obtain a dimension-reduced processed sample. A feature of the processed sample usually does not directly correspond to a certain feature in the original sample, but is a result obtained after an operation is performed on multiple features in the original sample.

For example, the operation dimension reduction method includes a principal component analysis (PCA) method. In the PCA method, raw n-dimensional data is transformed into a group of linearly independent representations of dimensions through linear orthogonal transformation. In a transformation result, the first principal component has a maximum variance, and each subsequent component has a maximum variance under the condition of orthogonal to the previous principal component.

More specifically, assume that there are m pieces of n-dimensional data. According to the PCA method, the raw data first constitutes a matrix X with n rows and m columns by columns, zero mean is performed on each row of the matrix X (that is, a mean value of the row is subtracted), and then a covariance matrix C of the matrix X, features of the matrix C, and corresponding eigenvectors are obtained. Then, the eigenvectors are arranged into a matrix by rows from top to bottom based on the corresponding features, the first k rows are selected to constitute a matrix P, and Y=PX is selected as finally obtained k-dimensional data.

In a specific example, the operation dimension reduction method includes a least absolute shrinkage and selection operator (LASSO) method. The method is a shrinkage estimate. The basic idea of the method is to minimize the residual sum of squares under a constraint that the sum of absolute values of regression coefficients is less than a constant.

In a specific example, some transformation operations in a mathematical wavelet analysis process can eliminate some interference data, or can play a dimension reduction role. Therefore, the wavelet analysis can also be used as an operation dimension reduction method.

Other operation dimension reduction examples further include, for example, a linear discriminant (LDA) method, Laplacian eigenmaps, singular value decomposition (SVD), locally linear embedding (LLE), etc.

In an implementation, the multiple dimension reduction methods can alternatively include a feature sampling method, or can be referred to as a feature selection method. In the feature sampling method, a part of feature data in an original high-dimensional sample is selected for sampling, that is, a feature subset is constituted, and the feature subset constitutes dimension-reduced processed samples. In this case, a feature in the processed sample can directly correspond to a certain feature in the original sample. It can be understood that multiple sampling methods can be used to perform feature sampling.

In a specific example, feature sampling is performed on raw data by using a random sampling method, that is, some features are randomly selected from an original high-dimensional sample to constitute processed samples. In another example, feature sampling is performed by using a hash sampling method. According to the method, a hash operation is performed on an original high-dimensional sample, and feature data is determined based on a result of the hash operation.

In the feature selection field, a feature evaluation function is introduced to evaluate representativeness and predictability of a selected feature subset for an original high-dimensional sample. Feature sampling can be further divided into a filter feature selection method and a wrapper feature selection method based on different feature evaluation functions. The filter feature selection method usually does not depend on a specific learning algorithm to evaluate a feature subset, but evaluates a prediction capability of each feature based on an intrinsic characteristic of a data set, to find several features with a high ranking to constitute a feature subset. In such a method, it is usually considered that an optimal feature subset is constituted by several features with a high prediction capability. In the wrapper feature selection method, a subsequent learning algorithm is embedded in a feature selection process, quality of a feature set is determined by testing prediction performance of the feature subset for the algorithm, and little attention is paid to prediction performance of a single feature in the feature subset.

Multiple examples of the operation dimension reduction method and multiple examples of the feature sampling dimension reduction method are enumerated above. A person skilled in the art can select an appropriate dimension reduction method based on features of data to be processed, for example, based on features such as a dimension, data distribution, and a data structure of the historical sample in the historical sample set obtained in FIG. 3.

For example, in the example of FIG. 3, assume that each historical sample in the obtained normal historical sample set has 1000 dimensions. In an example, the first dimension reduction method can be the PCA method, and a first low-dimensional sample set of 100 dimensions is obtained; the second dimension reduction method can be the random sampling method, and a second low-dimensional sample set of 300 dimensions is obtained; and the third dimension reduction method can be the hash sampling method, and a third low-dimensional sample set of 200 dimensions is obtained.

It can be understood that the previous description is merely an example. In different implementations, the quantity (N) of used dimension reduction methods can be greater or less. A specific dimension reduction method used can be different from that in the previous example. A different dimension reduction proportion can be set for any specific dimension reduction method.

After dimension reduction is performed on the original historical sample set H, the N low-dimensional historical sample sets can be obtained based on dimension reduction, and are learnt by using an SVDD method. Specifically, for the ith low-dimensional historical sample set Li (the corresponding dimension is Di) obtained by using the dimension reduction method Pi, a hypersphere Qi is determined in a space whose dimension is Di by using the SVDD method, so that a relationship between the quantity of low-dimensional historical samples surrounded by the hypersphere Qi and a radius of the hypersphere satisfies a predetermined condition. As described above, based on the main idea of the SVDD method, the hypersphere Qi is determined by using the previous equations (1) and (2), so that the hypersphere Qi can include as many low-dimensional historical samples as possible and has a radius as small as possible. The relationship between the quantity of surrounded low-dimensional historical samples and the radius of the hypersphere is set by using the parameter C.

As such, a corresponding hypersphere Qi is determined for each low-dimensional historical sample set Li. As described above, the determined hypersphere Qi includes most of low-dimensional historical samples in a space corresponding to a dimension, but not all of the samples. Therefore, there can still be normal samples located outside the hypersphere. Correspondingly, in an implementation, in the training phase, statistics on distance distribution of all samples in the normal historical sample set relative to the hypersphere Qi in the low-dimensional space are further collected. For example, statistics on an average distance and a maximum distance of all the normal samples from a center of the hypersphere Qi in the low-dimensional space are collected. These collected distances can be used to determine a determining threshold needed for a prediction phase.

In the previous process, a normal historical sample set is learnt by using SVDD models. More specifically, dimension reduction is performed on the historical sample set by using multiple dimension reduction methods, and then a corresponding hypersphere is determined by using the SVDD model for each sample set obtained after dimension reduction. The multiple different dimension reduction methods are used, and therefore features obtained by using the dimension reduction methods can complement each other. As such, an information loss caused by dimension reduction is alleviated to the maximum extent. In addition, dimension reduction processing is performed, and therefore application of the SVDD becomes feasible. As such, a calculation obstacle caused by a dimension "explosion" is alleviated.

On this basis, an unknown sample can be predicted by using a model built by using the previous method.

Figure 4:
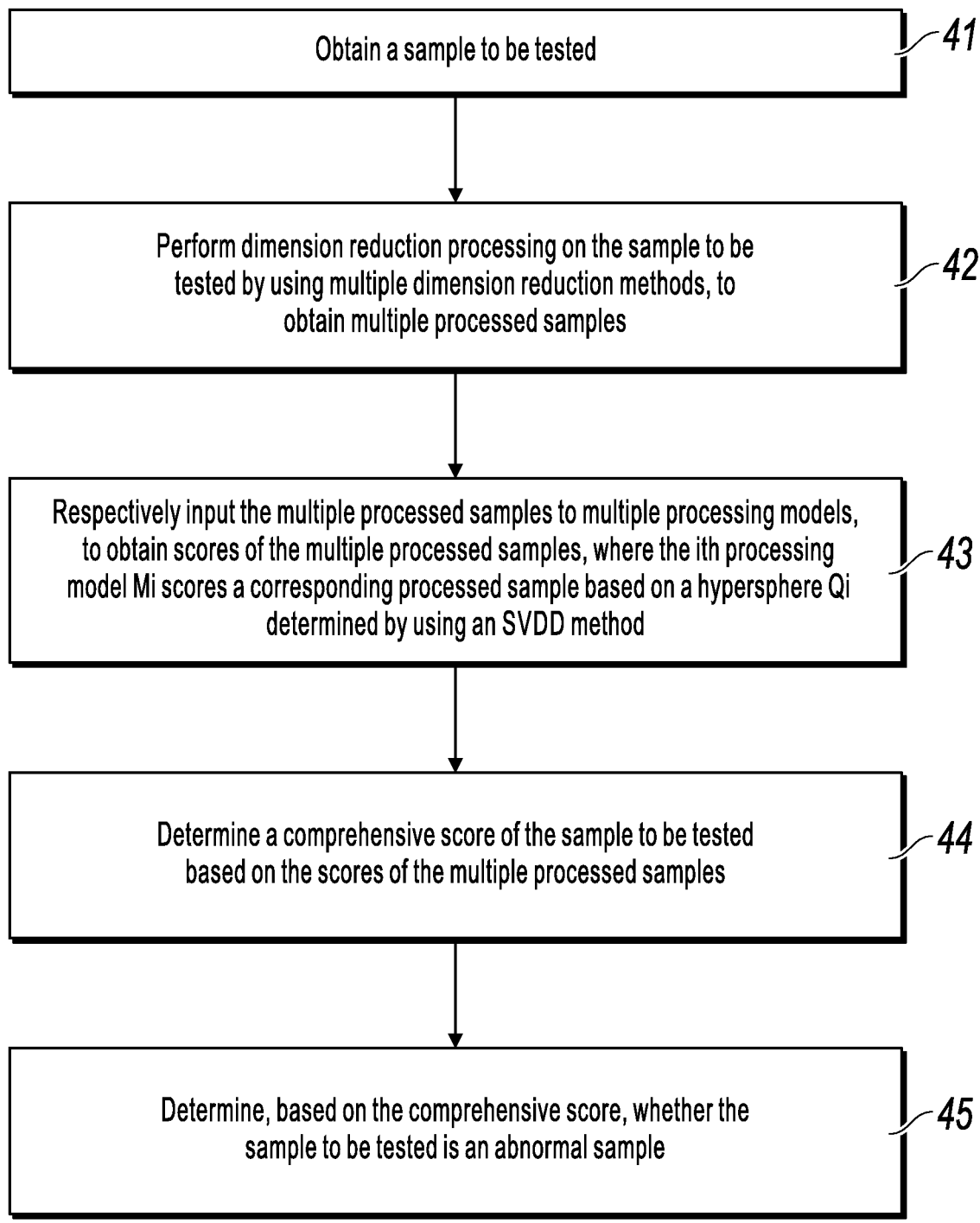
FIG. 4 is a flowchart illustrating an abnormal sample prediction method, according to an implementation.

FIG. 4 is a flowchart illustrating an abnormal sample prediction method, according to an implementation. The method can be performed by the computing platform shown in FIG. 1. As shown in FIG. 4, the abnormal sample prediction method in the present implementation includes the following steps: Step 41: Obtain a sample to be tested, where the sample to be tested includes feature data whose dimension is a first quantity. Step 42: Perform dimension reduction processing on the sample to be tested by using multiple dimension reduction methods, to obtain multiple processed samples, where the ith dimension reduction method Pi in the multiple dimension reduction methods processes the sample to be tested as a processed sample Si whose dimension is Di, and the dimension Di is less than the first quantity. Step 43: Respectively input the multiple processed samples to multiple corresponding processing models, to obtain scores of the multiple processed samples, where the ith processing model Mi scores the corresponding processed sample Si based on a hypersphere Qi predetermined by using a support vector domain description (SVDD) method in a space corresponding to the dimension. Step 44: Determine a comprehensive score of the sample to be tested based on the scores of the multiple processed samples. Step 45: Determine, based on the comprehensive score, whether the sample to be tested is an abnormal sample. The following describes specific implementations of the steps.

First, in step 41, the sample T to be tested is obtained. It can be understood that the sample to be tested is a sample of an unknown type, and is a high-dimensional sample same as a historical sample used for model training. More specifically, the sample to be tested has the same dimension as the historical sample in the previous historical sample set. The dimension quantity is referred to as the first quantity here.

Then, in step 42, dimension reduction processing is performed on the sample T to be tested by using the multiple dimension reduction methods, to obtain the multiple processed samples. It can be understood that the multiple dimension reduction methods here are respectively consistent with multiple dimension reduction methods in a training phase. Specifically, the ith dimension reduction method Pi in the multiple dimension reduction methods processes the sample T to be tested as the processed sample Si whose dimension is Di, and the dimension Di is less than the first quantity. Dimensions of the multiple processed samples respectively obtained by using the multiple dimension reduction methods can be different, but are all less than the original dimension (the first quantity) of the sample to be tested.

As described above, the dimension reduction methods can use various known dimension reduction algorithms and dimension reduction algorithms that may be used later, for example, an operation dimension reduction method and a feature sampling method. The operation dimension reduction method further includes one or more of the following: a principal component analysis (PCA) method, a least absolute shrinkage and selection operator (LASSO) method, a wavelet analysis method, a linear discriminant analysis (LDA) method, Laplacian eigenmaps, singular value decomposition (SVD), locally linear embedding (LLE), etc. The feature sampling method further includes one or more of the following: a random sampling method, a hash sampling method, a filter feature selection method, a wrapper feature selection method, etc. For detailed description of the specific dimension reduction methods, references can be made to the previous description. Details are omitted here for simplicity. However, it should be understood that regardless of several specific dimension reduction methods that are used, the multiple dimension reduction methods used in step 42 need to be consistent with dimension reduction methods in a historical sample learning phase.

After the sample to be tested is processed as the multiple processed samples through dimension reduction by using the multiple dimension reduction methods, in step 43, the multiple processed samples are respectively input to the multiple corresponding processing models, to obtain the scores of the multiple processed samples, where the ith processing model Mi scores the corresponding processed sample Si based on the hypersphere Qi predetermined by using the SVDD method in the space corresponding to the dimension.

It can be understood that in the historical sample learning stage, a corresponding hypersphere Qi is determined by using the SVDD method in a space obtained after dimension reduction. The hypersphere Qi has a radius as small as possible and can include as many historical samples obtained after dimension reduction as possible. Thus, the hypersphere Qi can be used to determine or predict the possibility that a currently input processed sample with the same dimension is an abnormal sample. Specifically, in an implementation, this possibility is measured through scoring.

In an implementation, the process in which the processing model Mi scores the corresponding processed sample Si can include: determining a location relationship between the processed sample Si and the hypersphere Qi in the space corresponding to the dimension; and determining a score of the processed sample Si based on the location relationship.

More specifically, the location relationship can be that the processed sample Si is located outside, inside, or above the hypersphere Qi. In an example, the processing model Mi can be set as follows: If the processed sample Si is located inside the hypersphere Qi in the space corresponding to the dimension (the space corresponding to the dimension Di), the score of the processed sample Si is 1. If the processed sample Si is exactly located on a surface of the hypersphere Qi (which is similar to a support vector), the score of the processed sample Si is 0.5. If the processed sample Si is located outside the hypersphere Qi, the score of the processed sample Si is 0. As such, a higher score means a higher possibility that the processed sample Si corresponds to a normal sample.

In an implementation, the location relationship can be a distance from the hypersphere Qi. More specifically, in an example, the processing model Mi scores the processed sample Si based on a distance d between the processed sample Si and a center of the hypersphere Qi in the space corresponding to the dimension. The processed sample Si and the center of the hypersphere respectively correspond to points in the space whose dimension is Di. Therefore, the distance d can be calculated by using a method for calculating a distance between two points in a multidimensional space. After the distance d is calculated, for example, the score Gi of the processed sample Si can be calculated based on the following equation:

$$Gi = \exp(-d) \qquad (3).$$

Based on the equation (3), a value of Gi ranges from 0 to 1. A shorter distance between the processed sample Si and the center of the hypersphere Qi indicates that the processed sample Si is closer to the center of the hypersphere, and a smaller value of d indicates a larger value of Gi. A longer distance between the processed sample Si and the center of the hypersphere Qi indicates that the processed sample Si is farther from the center of the hypersphere, and a larger value of d indicates a smaller value of Gi. As such, a higher value of Gi means a higher probability that the processed sample Si corresponds to a normal sample.

In another implementation, the distance between the processed sample Si and the hypersphere is calculated by using a different method. For example, in some SVDD models, the obtained hypersphere Qi does not correspond to an isotropic sphere, but has different "radii" in different directions, which is similar to an ellipsoid in a three-dimensional space. In this case, in an implementation, whether the processed sample Si is located inside the hypersphere Qi is first determined. If the processed sample Si is located inside the hypersphere Qi, it is set that Gi=1. If the processed sample Si is located outside the hypersphere Qi, a distance d between the processed sample Si and the nearest surface of the hypersphere Qi in the space corresponding to the dimension is calculated, and the score Gi is calculated based on the distance d by using the equation (3).

Specific examples of scoring the processed sample based on the predetermined hypersphere are merely provided above. When reading these examples, a person skilled in the art can modify, replace, combine, or expand these examples, to use more scoring methods, which shall fall within the concept of the present specification. In addition, in step 43, the multiple processing models respectively score the processed samples of the corresponding dimension. The multiple processing models can use the same scoring algorithm or different scoring algorithms.

After each processing model Mi scores each processed sample Si in step 43, next, in step 44, the comprehensive score of the sample to be tested is determined based on the scores of the multiple processed samples.

In an implementation, in the present step, the scores of the multiple processed samples are directly added together, and a summation result is used as the composite score. In another implementation, a specific weight is pre-allocated to a score given by each processing model, and weighted summation is performed on the scores of the multiple processed samples based on the allocated weight, to obtain the comprehensive score.

Therefore, in step 45, whether the sample to be tested is an abnormal sample is determined based on the comprehensive score. In an implementation, in the present step, the comprehensive score determined in step 44 is compared with a predetermined threshold, and whether the sample to be tested is an abnormal sample is determined based on a comparison result. It can be understood that determining of the threshold is related to the scoring algorithm in step 43. For example, when scoring is performed based on the equation (3), a higher comprehensive score means a higher probability that the sample to be tested corresponds to a normal sample. Alternatively, in an implementation, the threshold can be determined based on statistics in the sample learning phase. As described above, in the sample learning phase, statistics on distance distribution of all samples in a normal historical sample set relative to the hypersphere Qi in the low-dimensional space can be further collected. In an implementation, statistics of the comprehensive score are calculated for the normal historical sample based on these distance statistics by using a scoring algorithm consistent with that in step 43, and the determining threshold is determined based on the statistics of the comprehensive score. Based on the threshold determined by using this method, in step 45, whether the sample to be tested is an abnormal sample can be simply determined by making a comparison with the threshold.

Figure 5:
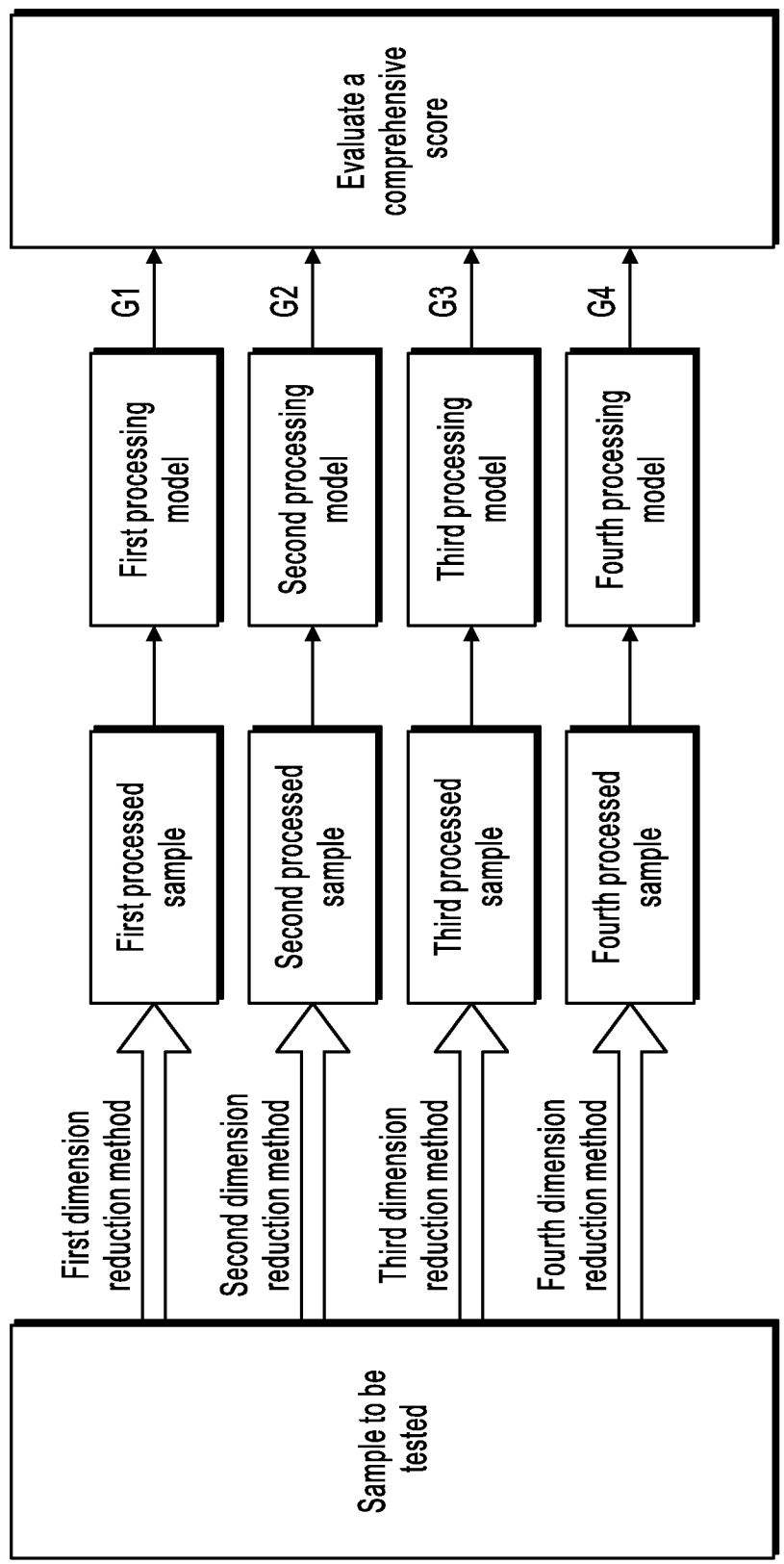
FIG. 5 is a flowchart illustrating an abnormal sample prediction process, according to an implementation.

FIG. 5 is a schematic diagram illustrating an abnormal sample prediction process, according to an implementation. In addition, the prediction process in FIG. 5 is implemented based on the prediction model built in FIG. 3. As shown in FIG. 5, a high-dimensional sample T to be tested is first obtained. The sample T to be tested has the same dimension as the sample in the historical sample set H shown in FIG. 3. Then, dimension reduction is performed on the sample T to be tested by using multiple dimension reduction methods, to obtain multiple processed samples. Specifically, corresponding to FIG. 3, the multiple dimension reduction methods are specifically a first dimension reduction method, a second dimension reduction method, a third dimension reduction method, and a fourth dimension reduction method. Dimension reduction processing is performed on the sample T to be tested by using these dimension reduction methods, to obtain a first processed sample, a second processed sample, a third processed sample, and a fourth processed sample. Dimensions of the first processed sample, the second processed sample, the third processed sample, and the fourth processed sample are respectively D1, D2, D3, and D4.

Then, the first processed sample, the second processed sample, the third processed sample, and the fourth processed sample are respectively input to a first processing model, a second processing model, a third processing model, and a fourth processing model, to obtain scores of the multiple processed samples. Specifically, the first processing model gives the score G1 to the first processed sample based on a hypersphere Q1 obtained in FIG. 3, the second processing model gives the score G2 to the second processed sample based on a hypersphere Q2 obtained in FIG. 3, the third processing model gives the score G3 to the third processed sample based on a hypersphere Q3 obtained in FIG. 3, and the fourth processing model gives the score G4 to the fourth processed sample based on a hypersphere Q4 obtained in FIG. 3. Then, a comprehensive score G of the sample to be tested is determined based on the scores G1 to G4 of the processed samples, and whether the sample to be tested is an abnormal sample is determined based on the comprehensive score G.

In the previous process, dimension reduction is performed on a sample to be tested by using multiple dimension reduction methods, then, multiple processed samples obtained after dimension reduction are scored respectively based on hyperspheres determined based on SVDD models, and finally, whether the sample to be tested is abnormal is determined based on a comprehensive result of multiple scores. The multiple different dimension reduction methods are used, and therefore features obtained by using the dimension reduction methods can complement each other. As such, an information loss caused by dimension reduction is alleviated to the maximum extent. In addition, dimension reduction processing is performed, and therefore application of the SVDD models becomes feasible. As such, a calculation obstacle caused by a dimension "explosion" is alleviated. On this basis, the results of the SVDD models are comprehensively considered, so that the sample to be tested can be comprehensively evaluated and accurately predicted.

Figure 6:
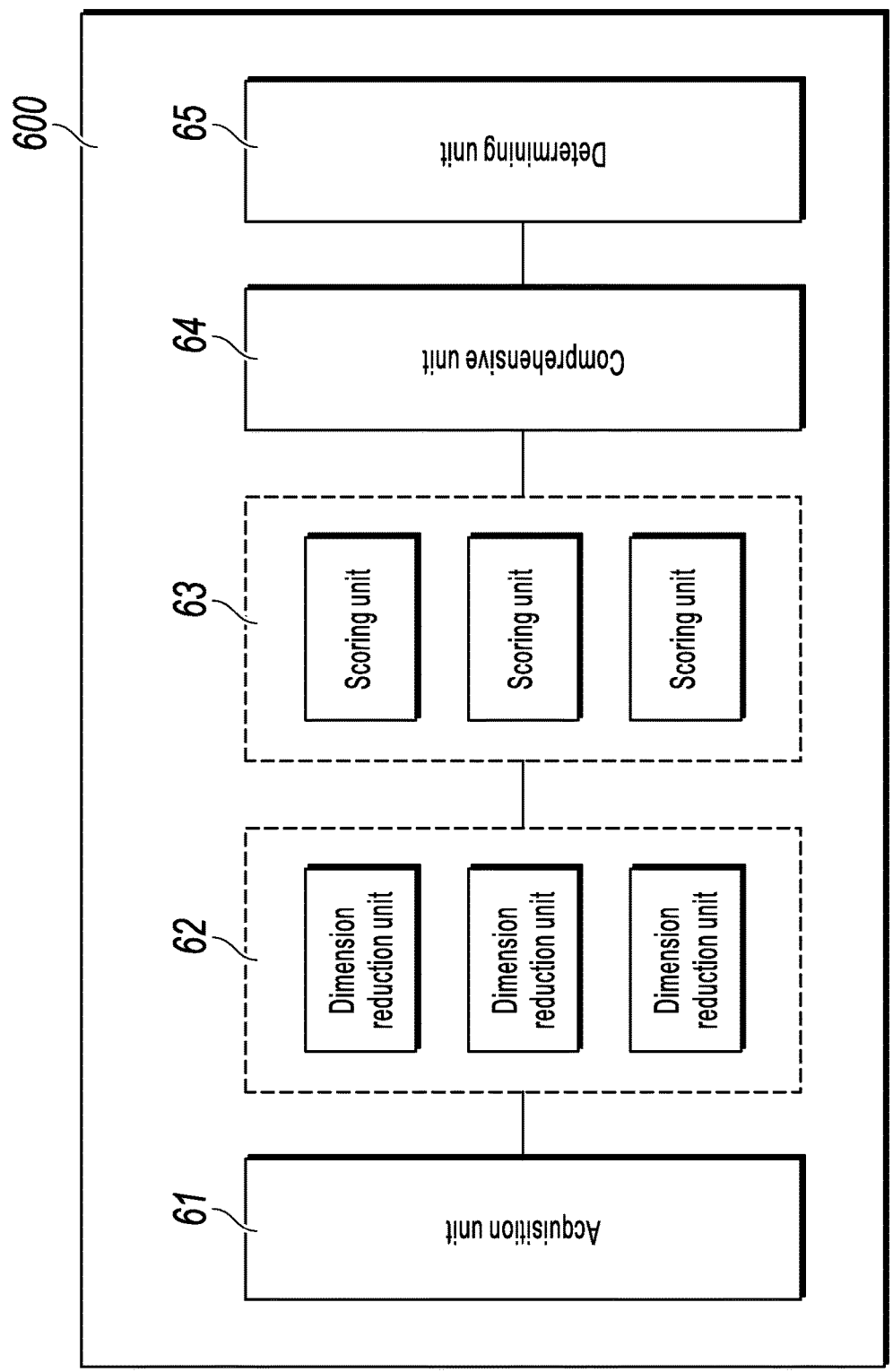
FIG. 6 is a schematic block diagram illustrating an abnormal sample prediction apparatus, according to an implementation.

In an implementation of another aspect, an abnormal sample prediction apparatus is further provided. FIG. 6 is a schematic block diagram illustrating an abnormal sample prediction apparatus, according to an implementation. As shown in FIG. 6, the apparatus 600 includes: an acquisition unit 61, configured to obtain a sample to be tested, where the sample to be tested includes feature data whose dimension is a first quantity; multiple dimension reduction units 62, where the multiple dimension reduction units are configured to perform dimension reduction processing on the sample to be tested by using multiple dimension reduction methods, to obtain multiple processed samples, the ith dimension reduction method Pi in the multiple dimension reduction methods processes the sample to be tested as a processed sample Si whose dimension is Di, and the dimension Di is less than the first quantity; multiple scoring units 63, configured to score the multiple processed samples by using multiple processing models, where the ith processing model Mi in the multiple processing models scores the corresponding processed sample Si based on a hypersphere Qi predetermined by using a support vector domain description (SVDD) method in a space corresponding to the dimension Di; a comprehensive unit 64, configured to determine a comprehensive score of the sample to be tested based on scores of the multiple processed samples; and a determining unit 65, configured to determine, based on the comprehensive score, whether the sample to be tested is an abnormal sample. In FIG. 6, there are three dimension reduction units 62 and three scoring units. However, it can be understood that quantities of dimension reduction units and scoring units can be set based on needs, and are not limited to the quantity in FIG. 6.

In an implementation, the multiple dimension reduction methods used by the multiple dimension reduction units 62 include at least one of an operation dimension reduction method and a feature sampling dimension reduction method.

In an implementation, the operation dimension reduction method includes one or more of the following: a principal component analysis (PCA) method, a least absolute shrinkage and selection operator (LASSO) method, a linear discriminant analysis (LDA) method, and a wavelet analysis method.

In an implementation, the feature sampling dimension reduction method includes one or more of the following: a random sampling method, a hash sampling method, a filter feature selection method, and a wrapper feature selection method.

In an implementation, the ith processing model Mi is trained by using an ith training apparatus, and the ith training apparatus includes: a sample set acquisition module, configured to obtain a known normal historical sample set, where a sample dimension of the historical sample set is the first quantity; an ith dimension reduction module, configured to process the historical sample set as a low-dimensional historical sample set Li whose sample dimension is Di by using the ith dimension reduction method Pi; and a hypersphere determining module, configured to determine the hypersphere Qi in the space whose dimension is Di by using the SVDD method, so that a relationship between the quantity of samples in a low-dimensional historical sample set Li surrounded by the hypersphere Qi and a radius of the hypersphere satisfies a predetermined condition.

In an implementation, the multiple scoring units 63 are configured to determine a relative location of the processed sample Si relative to the hypersphere Qi in the space corresponding to the dimension Di; and determine a score of the processed sample Si based on the relative location.

In an implementation, the relative location includes one of the following: the processed sample Si is located outside, inside, or above the hypersphere Qi; a distance between the processed sample Si and a center of the hypersphere Qi in the space corresponding to the dimension; and a distance between the processed sample Si and the nearest surface of the hypersphere Qi in the space corresponding to the dimension.

In an implementation, the comprehensive unit 64 is configured to perform weighted summation on the scores of the multiple processed samples to obtain the comprehensive score.

According to the apparatus, dimension reduction is performed on a sample to be tested by using multiple dimension reduction methods, and the dimension reduction methods complement each other, to alleviate an information loss caused by dimension reduction. Multiple processed samples obtained after dimension reduction are scored respectively based on hyperspheres determined based on SVDD models, and finally, whether the sample to be tested is abnormal is determined based on a comprehensive result of multiple scores. As such, the results of the SVDD models are comprehensively considered, so that the sample to be tested can be comprehensively evaluated and accurately predicted.

In an implementation of another aspect, a computer-readable storage medium is further provided. The computer-readable storage medium stores a computer program, and when the computer program is executed in a computer, the computer is enabled to perform the method described with reference to FIG. 3 to FIG. 5.

In an implementation of still another aspect, a computing device is further provided, and includes a memory and a processor. The memory stores executable code, and when the processor executes the executable code, the method described with reference to FIG. 3 to FIG. 5 is implemented.

A person skilled in the art should be aware that in the previous one or more examples, functions described in the present disclosure can be implemented by hardware, software, firmware, or any combination thereof. When the functions are implemented by software, the functions can be stored in a computer-readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for sample prediction, comprising:
   obtaining a historical sample set, wherein a sample dimension of the historical sample set is a first quantity;
   training a first processing model, wherein training the first processing model comprises:
   processing the historical sample set as a historical sample set of a first dimension by using a first dimension reduction process, wherein the first dimension is less than the first quantity;
   determining a first hypersphere in a first space corresponding to the first dimension by using a support vector domain description (SVDD) method in the first space, wherein a first quantity of samples in the historical sample set are surrounded by the first hypersphere, and wherein a radius of the first hypersphere satisfies a first predetermined condition;
   training a second processing model, wherein training the second processing model comprises:

processing the historical sample set as a historical sample set of a second dimension by using a different second dimension reduction process that is different than the first dimension reduction process, wherein the second dimension is less than the first quantity;

determining a second hypersphere in a second space corresponding to the second dimension by using a SVDD method in the second space, wherein a second quantity of samples in the historical sample set are surrounded by the second hypersphere, and wherein a radius of the second hypersphere satisfies a second predetermined condition;

obtaining a sample to be tested, wherein the sample to be tested comprises feature data with a given dimension, and wherein the given dimension is the first quantity;

performing the first dimension reduction process on the sample to be tested;

generating a first processed sample of the first dimension that is less than the first quantity based on performing the first dimension reduction process on the sample to be tested;

performing the different second dimension reduction process on the sample to be tested, wherein performing the second dimension reduction process and the first dimension reduction process alleviates information loss caused by dimension reduction;

generating a second processed sample of the second dimension that is less than the first quantity based on performing the second dimension reduction process on the sample to be tested;

inputting the first processed sample of the first dimension to the first processing model, wherein the first processing model generates a first score of the first processed sample based on the first hypersphere determined by using the SVDD method in the first space corresponding to the first dimension;

inputting the second processed sample of the second dimension to the second processing model, where the second processing model generates a second score of the second processed sample based on the second hypersphere determined by using the SVDD method in the second space corresponding to the second dimension;

determining a comprehensive score of the sample to be tested based on at least the first score of the first processed sample and the second score of the second processed sample; and classifying, based on the comprehensive score, the sample to be tested.

2. The computer-implemented method of claim 1, wherein the first dimension reduction process and the second dimension reduction process comprise at least one of an operation dimension reduction method and a feature sampling dimension reduction method.

3. The computer-implemented method of claim 2, wherein the operation dimension reduction method comprises one or more of the following:

a principal component analysis (PCA) method, a least absolute shrinkage and selection operator (LASSO) method, a linear discriminant analysis (LDA) method, and a wavelet analysis method.

4. The computer-implemented method of claim 2, wherein the feature sampling dimension reduction method comprises one or more of the following:

a random sampling method, a hash sampling method, a filter feature selection method, and a wrapper feature selection method.

5. The computer-implemented method of claim 1, wherein determining the comprehensive score of the sample to be tested comprises:

determining a relative location of the first processed sample relative to the first hypersphere in the first space corresponding to the first dimension; and determining the first score of the first processed sample based on the relative location.

6. The computer-implemented method of claim 5, wherein the relative location comprises one of the following: outside, inside, or above the first hypersphere;

a distance between the first processed sample and a center of the first hypersphere in the first space corresponding to the first dimension; and a distance between the first processed sample and a surface of the first hypersphere in the first space corresponding to the first dimension.

7. The computer-implemented method of claim 1, wherein determining the comprehensive score of the sample to be tested comprises:

performing weighted summation on at least the first score of the first processed sample and the second score of the second processed sample.

8. A non-transitory, computer-readable medium storing one or more instructions executable by a computer system to perform operations comprising:

obtaining a historical sample set, wherein a sample dimension of the historical sample set is a first quantity;

training a first processing model, wherein training the first processing model comprises:

processing the historical sample set as a historical sample set of a first dimension by using a first dimension reduction process, wherein the first dimension is less than the first quantity;

determining a first hypersphere in a first space corresponding to the first dimension by using a support vector domain description (SVDD) method in the first space, wherein a first quantity of samples in the historical sample set are surrounded by the first hypersphere, and wherein a radius of the first hypersphere satisfies a first predetermined condition;

training a second processing model, wherein training the second processing model comprises:

processing the historical sample set as a historical sample set of a second dimension by using a different second dimension reduction process that is different than the first dimension reduction process, wherein the second dimension is less than the first quantity;

determining a second hypersphere in a second space corresponding to the second dimension by using a SVDD method in the second space, wherein a second quantity of samples in the historical sample set are surrounded by the second hypersphere, and wherein a radius of the second hypersphere satisfies a second predetermined condition;

obtaining a sample to be tested, wherein the sample to be tested comprises feature data with a given dimension, and wherein the given dimension is the first quantity;

performing the first dimension reduction process on the sample to be tested;

generating a first processed sample of the first dimension that is less than the first quantity based on performing the first dimension reduction process on the sample to be tested;

performing the different second dimension reduction process on the sample to be tested, wherein performing the second dimension reduction process and the first dimension reduction process alleviates information loss caused by dimension reduction;

generating a second processed sample of the second dimension that is less than the first quantity based on performing the second dimension reduction process on the sample to be tested;

inputting the first processed sample of the first dimension to the first processing model, wherein the first processing model generates a first score of the first processed sample based on the first hypersphere determined by using the SVDD method in the first space corresponding to the first dimension;

inputting the second processed sample of the second dimension to the second processing model, where the second processing model generates a second score of the second processed sample based on the second hypersphere determined by using the SVDD method in the second space corresponding to the second dimension;

determining a comprehensive score of the sample to be tested based on at least the first score of the first processed sample and the second score of the second processed sample; and classifying, based on the comprehensive score, the sample to be tested.

9. The non-transitory, computer-readable medium of claim 8, wherein the first dimension reduction process and the second dimension reduction process comprise at least one of an operation dimension reduction method and a feature sampling dimension reduction method.

10. The non-transitory, computer-readable medium of claim 9, wherein the operation dimension reduction method comprises one or more of the following:

a principal component analysis (PCA) method, a least absolute shrinkage and selection operator (LASSO) method, a linear discriminant analysis (LDA) method, and a wavelet analysis method.

11. The non-transitory, computer-readable medium of claim 9, wherein the feature sampling dimension reduction method comprises one or more of the following:

a random sampling method, a hash sampling method, a filter feature selection method, and a wrapper feature selection method.

12. The non-transitory, computer-readable medium of claim 8, wherein determining the comprehensive score of the sample to be tested comprises:

determining a relative location of the first processed sample relative to the first hypersphere in the first space corresponding to the first dimension; and determining the first score of the first processed sample based on the relative location.

13. The non-transitory, computer-readable medium of claim 12, wherein the relative location comprises one of the following:

outside, inside, or above the first hypersphere;

a distance between the first processed sample and a center of the first hypersphere in the first space corresponding to the first dimension; and a distance between the first processed sample and a surface of the first hypersphere in the first space corresponding to the first dimension.

14. The non-transitory, computer-readable medium of claim 8, wherein determining the comprehensive score of the sample to be tested comprises:

performing weighted summation on at least the first score of the first processed sample and the second score of the second processed sample.

15. A computer-implemented system, comprising: one or more computers; and one or more computer memory devices interoperably coupled with the one or more computers and having one or more non-transitory, computer-readable media storing one or more instructions that, when executed by the one or more computers, perform one or more operations comprising: obtaining a historical sample set, wherein a sample dimension of the historical sample set is a first quantity; training a first processing model, wherein training the first processing model comprises: processing the historical sample set as a historical sample set of a first dimension by using a first dimension reduction process, wherein the first dimension is less than the first quantity; determining a first hypersphere in a first space corresponding to the first dimension by using a support vector domain description (SVDD) method in the first space, wherein a first quantity of samples in the historical sample set are surrounded by the first hypersphere, and wherein a radius of the first hypersphere satisfies a first predetermined condition; training a second processing model, wherein training the second processing model comprises: processing the historical sample set as a historical sample set of a second dimension by using a different second dimension reduction process that is different than the first dimension reduction process, wherein the second dimension is less than the first quantity; determining a second hypersphere in a second space corresponding to the second dimension by using a SVDD method in the second space, wherein a second quantity of samples in the historical sample set are surrounded by the second hypersphere, and wherein a radius of the second hypersphere satisfies a second predetermined condition; obtaining a sample to be tested, wherein the sample to be tested comprises feature data with a given dimension, and wherein the given dimension is the first quantity; performing the first dimension reduction process on the sample to be tested; generating a first processed sample of the first dimension that is less than the first quantity based on performing the first dimension reduction process on the sample to be tested; performing the different second dimension reduction process on the sample to be tested, wherein performing the second dimension reduction process and the first dimension reduction process alleviates information loss caused by dimension reduction; generating a second processed sample of the second dimension that is less than the first quantity based on performing the second dimension reduction process on the sample to be tested; inputting the first processed sample of the first dimension to the first processing model, wherein the first processing model generates a first score of the first processed sample based on the first hypersphere determined by using the SVDD method in the first space corresponding to the first dimension; inputting the second processed sample of the second dimension to the second processing model, where the second processing model generates a second score of the second processed sample based on the second hypersphere determined by using the SVDD method in the second space corresponding to the second dimension; determining a comprehensive score of the sample to be tested based on at least the first score of the first processed sample and the second score of the second processed sample; and classifying, based on the comprehensive score, the sample to be tested.

16. The computer-implemented system of claim 15, wherein the first dimension reduction process and the second dimension reduction process comprise at least one of an operation dimension reduction method and a feature sampling dimension reduction method.

17. The computer-implemented system of claim 16, wherein the operation dimension reduction method comprises one or more of the following:
   a principal component analysis (PCA) method, a least absolute shrinkage and selection operator (LASSO) method, a linear discriminant analysis (LDA) method, and a wavelet analysis method.

18. The computer-implemented system of claim 16, wherein the feature sampling dimension reduction method comprises one or more of the following:
   a random sampling method, a hash sampling method, a filter feature selection method, and a wrapper feature selection method.

19. The computer-implemented system of claim 15, wherein determining the comprehensive score of the sample to be tested comprises:
   determining a relative location of the first processed sample relative to the first hypersphere in the first space corresponding to the first dimension; and
   determining the first score of the first processed sample based on the relative location.

20. The computer-implemented system of claim 19, wherein the relative location comprises one of the following:
   outside, inside, or above the first hypersphere;
   a distance between the first processed sample and a center of the first hypersphere in the first space corresponding to the first dimension; and
   a distance between the first processed sample and a surface of the first hypersphere in the first space corresponding to the first dimension.

21. The computer-implemented system of claim 15, wherein determining the comprehensive score of the sample to be tested comprises:
   performing weighted summation on at least the first score of the first processed sample and the second score of the second processed sample.

* * * * *